United States Patent [19]

Grewal et al.

[11] Patent Number: 4,482,209
[45] Date of Patent: Nov. 13, 1984

[54] MIRROR STRUCTURE

[75] Inventors: Virinder Grewal, Ebersberg; Werner Reindl, Unterhaching, both of Fed. Rep. of Germany

[73] Assignee: Siemens Aktiengesellschaft, Berlin & Munich, Fed. Rep. of Germany

[21] Appl. No.: 346,099

[22] Filed: Feb. 5, 1982

[30] Foreign Application Priority Data

Feb. 27, 1981 [DE] Fed. Rep. of Germany ....... 3007612

[51] Int. Cl.$^3$ .......................... G02B 5/08; B32B 9/00; B32B 3/00; C25D 11/02
[52] U.S. Cl. .................................. 350/642; 428/629; 428/469; 427/162
[58] Field of Search ............... 428/629, 630, 632, 635, 428/641, 651, 674, 687, 469; 350/288; 427/162, 163

[56] References Cited

FOREIGN PATENT DOCUMENTS 0930428 7/1955 Fed. Rep. of Germany ...... 350/288
6089702 12/1979 Japan .................... 350/288

OTHER PUBLICATIONS

G. Hass et al. "Reflectance and Durability of Ag Mirrors Coated with Thin Layers of $Al_2O_3$ plus Reactively Deposited Silicon Oxide" *Applied Optics*, vol. 14, No. 11, Nov. 1975, pp. 2639–2644.

Primary Examiner—John K. Corbin
Assistant Examiner—David Lewis
Attorney, Agent, or Firm—Hill, Van Santen, Steadman & Simpson

[57] ABSTRACT

A mirror structure which is provided on a polished metallic surface characterized by an adhesive layer disposed directly on the surface, an amorphous intermediate layer disposed on the adhesive layer, a reflective layer disposed on the amorphous intermediate layer and a protective layer covering the reflective layer. The mirror structure is particularly useful for a highly adhesive and corrosion-proof laser mirror which has good reflection properties and is used in a laser flatbed scanner.

7 Claims, 1 Drawing Figure

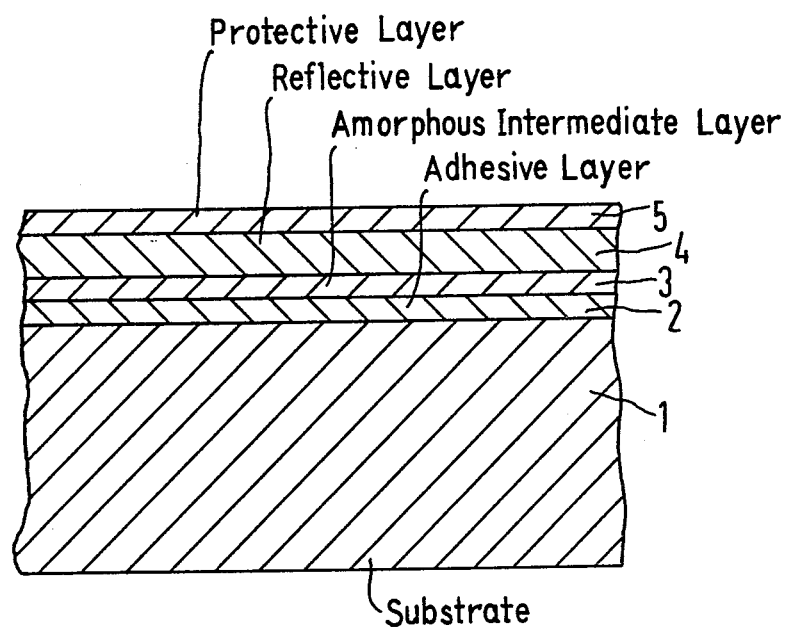

MIRROR STRUCTURE

BACKGROUND OF THE INVENTION

The present invention is directed to a highly adhesive, highly reflective and corrosion-proof layer structure for laser mirrors, in particular laser polygonal mirrors. The layer structure of the mirror is applied on a polish metal surface of a substrate and includes an adhesive layer which is applied to the metal surface, an intermediate layer and a reflection layer applied on the intermediate layer and provided with a protective layer.

Polygonal mirrors consisting of aluminium alloys or brass alloys are used for example for laser flatbed scanners. Smooth mirror surfaces, which have a negligible roughness are produced by means of a chip-removing polish cutting of the polygonal mirror. The metal surfaces are not sufficiently corrosion proof in the case of climatic and thermal storage and therefore will have a reduced reflection factor.

In accordance with previously known processes, the polished metallic surface had vaporized thereon an adhesive layer and subsequently vaporized with an aluminium reflection layer followed by a quartz protection layer. The adhesive strength of this layer structure was not sufficient. The reflection factor was reduced by corrosion which was influenced by both climate and temperature.

Moreover, it has been demonstrated that with time, the course crystal layer of the fundamental materials, for example, the polished metal surface is induced into the reflection layer, so that the reflection layer becomes rough and the reflectivity is impaired. It has been suggested to apply an intermediate layer between the fundmental material of the substrate and the reflection layer as an adhesive layer. However, this intermediate layer had problems as pointed out in German patent specification No. 930,428 and in an article by Hass et al, "Reflectance and durability of Ag mirrors coated with thin layers of $Al_2O_3$ plus reactively deposited silicon oxide", *Applied Optics*, Vol. 14, No. 11, November 1975, pages 2639 to 2644. This procedure also has disadvantages because even the course crystal and structure of the intermediate layer will be imposed or represented on the reflection layer in the course of time and cause it to become rough and therefore lose its reflectivity.

SUMMARY OF THE INVENTION

The present invention is directed to providing a mirror, such as laser mirror, which is a highly adhesive and corrosion-proof and exhibits excellence and unchanged reflection properties even after long use.

To accomplish these objects, the present invention is directed to an improvement in a layer structure in a mirror having a highly adhesive, highly reflective and corrosion-proof layer structure disposed on a polished metallic surface with an adhesive layer applied directly to the metallic surface and a reflective layer covering the adhesive layer and being provided with a protective layer. The improvement comprises an amorphous intermediate layer being disposed between the adhesive layer and the reflection layer as a diffusion blockage layer.

Preferably the layer structure of the mirror is produced by placing the substrate in a vacuum and then depositing each of the individual layers thereon. The step of depositing can be by vapor depositing or by a sputter depositing.

The mirror structure, which is preferably a laser mirror such as a laser polygonal mirror comprises an adhesive layer selected from a group consisting of titanium and chromium; an intermediate layer selected from a group consisting of aluminum oxide and silicon dioxide; a reflective layer which is selected from a group consisting of aluminum and silver; and a protective layer which is selected from a group consisting of aluminum oxide and silicon dioxide. Preferably, the adhesive layer will have a thickness in a range of 10 nm to 200 nm; the intermediate layer will have a thickness in the range of 50 nm to 500 nm; the reflection or reflective layer will have a thickness in the range of 100 nm and 1000 nm and the protective layer will have a thickness of approximately 30 nm to 300 nm.

The mirror in accordance with the present invention has proved favorable in relation to known mirrors. This is due to the fact that the amorphous intermediate layer, which operates as a diffusion blockage layer, prevents the structure of the adhesive layer from being imposed or represented on the reflection layer (epitaxy effect) in the course of time. This prevents the occurrence of a rough mirror surface by which the reflectivity is substantially impaired.

BRIEF DESCRIPTION OF THE DRAWING

The FIGURE is a partial cross-sectional view of a layered mirror structure in accordance with the present invention.

DESCRIPTION OF THE PREFERRED EMBODIMENTS

The present invention is particulary useful in a layered mirror structure which is applied on a metallic substrate and particularly a layered mirror structure which is applied on a polygonal shaped substrate which forms a polygonal mirror used as a laser flatbed scanner for deflecting a laser beam along a surface for purposes of scanning.

The mirror structure of the present invention consists of a substrate 1 such as a polygonal substrate having a cross-sectional shape of a polygon which substrate consists of an aluminum alloy or brass alloy which has flat surfaces which are smooth mirror surfaces and have negligible roughness. These are produced by means of chip removing polish cutting of the substrate surfaces. An adhesive layer 2, which may be selected of a material from a group consisting of titanium and chromium is deposited directly onto the metallic surface to a thickness preferably in a range 10 nm to 200 nm. Then, an intermediate layer 3, which consists of a material selected from a group consisting of aluminum oxide and silicon dioxide, is deposited on the adhesive layer 2 to a thickness in a range of 50 nm to 500 nm. After applying the intermediate layer 3, a reflection of reflective layer 4 which is of a material selected from a group consisting of aluminum and silver, is then desposited on the intermediate layer 3 to a thickness in the range of 100 nm to 1000 nm. Finally a protective layer 5 is applied onto the reflective layer 4 to a thickness of 30 nm to 300 nm and is of a material selected from a group consisting of aluminum oxide and silicon dixode.

These layers of the structure may be applied to the polished substrate surface by placing a substrate in a vacuum chamber and then depositing each of the layers in the desired sequence. The step of applying or depositing can be by vapor depositing and/or by sputter depositing.

It should be noted that because of the amorphous intermediate layer 3, it is possible to apply the reflection layer 4 with a finer crystal structure which advantageously improves the reflection behavior of the mirror. The long-term behavior of the reflection layer 4 of the mirror is improved overall and in conjunction with the adhesive layer 2 and the protective layer 5, the corrosion behavior also has an overall improvement. Long-term experiments have been carried out with the mirror produced in the present invention both under climatic storage which has a temperature 40° C. and a relative atmospheric moisture of 90% and also under thermal storage at a temperature of 100° C. After such storage, the mirrors are quantitatively analyzed with the aid of reflection measurements. These experiments have disclosed that in the case of the mirror of the structure of the present invention, there is no corrosion and the reflection factor therefore remains substantially unchanged.

Although various minor modifications may be suggested by those versed in the art, it should be understood that we wish to embody within the scope of the patent granted hereon, all such modifications as reasonably and properly come within the scope of our contribution to the art.

We claim:

1. A mirror structure having a highly adhesive, highly reflective and corrosion-proof layer structure disposed on a polished metallic surface, said layer structure consisting of an adhesive layer having a crystal structure being applied directly on the metallic surface, an amorphous intermediate layer consisting of aluminum oxide being applied on the adhesive layer, a reflective layer being applied on the intermediate layer and being covered with a protective layer, said amorphous intermediate layer being a diffusion blockage layer to prevent diffusion between the adhesive layer to the reflective layer and to prevent the crystal structure of the adhesive layer from being imposed on the reflective layer.

2. A mirror structure according to claim 1, wherein the adhesive layer has a thickness in the range of 10 nm to 200 nm; the intermediate layer has a thickness in the range of 50 nm to 500 nm; the reflective layer has a thickness in the range of 100 nm to 1000 nm; and the protective layer has a thickness in the range of 30 nm to 300 nm.

3. A mirror structure according to claim 1, wherein the adhesive layer consists of a material selected from a group consisting of titanium and chromium; the reflective layer consists of a material selected from a group consisting of aluminum and silver; and the protective layer consists of a material selected from a group consisting of aluminum dioxide and silicon dioxide.

4. A mirror structure according to claim 3, the adhesive layer has a thickness in the range of 10 to 200 nm; the intermediate layer has a thickness in the range of 50 to 500 nm; the reflective layer has a thickness in the range of 100 to 1000 nm; and the protective layer has a thickness in the range of 30 to 300 nm.

5. A process for producing a layered mirror structure comprising a polished metal surface, an adhesive layer disposed on said metal surface, an amorphous intermediate layer of aluminum oxide disposed on the adhesive layer, a reflective layer applied to the intermediate layer and a protective layer covering the reflective layer, said process including positioning the substrate in a vacuum and despositing each of said layers in sequence on said substrate.

6. A process according to claim 5, wherein the step of depositing comprises vapor depositing.

7. A process according to claim 5, wherein the step of depositing comprises a sputter depositing.

* * * * *